Oct. 16, 1923.
D. L. LAWSON
LUBRICATING DEVICE
Filed March 5, 1923
1,471,038
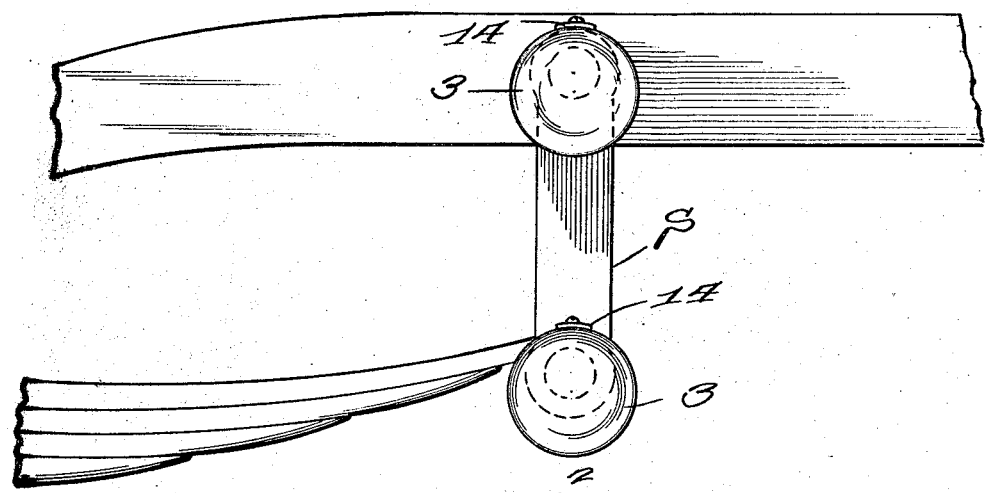
Fig.1.
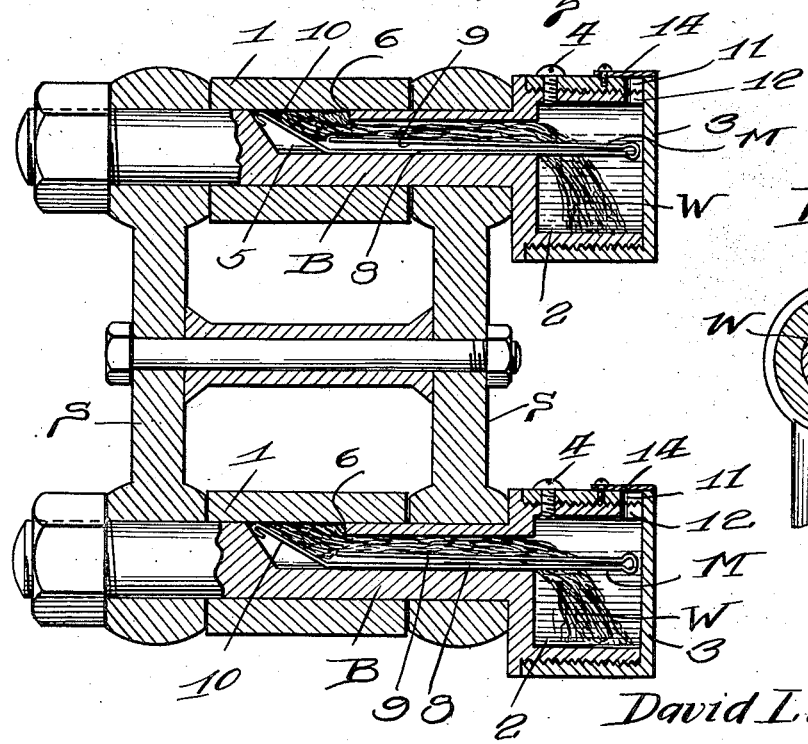
Fig.2.
Fig.3.
Inventor
David L. Lawson
By Watson E. Coleman
Attorney Patented Oct. 16, 1923.

1,471,038

UNITED STATES PATENT OFFICE.

DAVID L. LAWSON, OF ORBY, CALIFORNIA.

LUBRICATING DEVICE.

Application filed March 5, 1923. Serial No. 622,993.

*To all whom it may concern:*

Be it known that I, DAVID L. LAWSON, a citizen of the United States, residing at Orby, in the county of Santa Barbara and State of California, have invented certain new and useful Improvements in Lubricating Devices, of which the following is a specification, reference being had to the accompanying drawings.

This invention relates to certain improvements in lubricating devices and it is primarily an object of the invention to provide a bolt having novel and improved means whereby the same can be effectively and conveniently employed for the purposes of lubrication.

Another object of the invention is to provide a novel and improved device of this general character especially designed and adapted for use in connection with a spring shackle and wherein each of the shackle bolts is provided with means for effectively lubricating the connections between each of said bolts and the spring associated therewith.

Another object of the invention is to provide a device of this general character having novel and improved means whereby at no time will an excessive amount of lubricant be applied to the parts.

The invention consists in the details of construction and in the combination and arrangement of the several parts of my improved lubricating device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating a spring shackle having associated therewith a lubricating bolt constructed in accordance with an embodiment of my invention;

Figure 2 is an enlarged view partly in section and partly in elevation of the shackle as disclosed in Figure 1 illustrating in detail the construction of the lubricating bolt;

Figure 3 is a fragmentary cross sectional view taken through one of the bolts and the bushing associated therewith.

As disclosed in the accompanying drawings, S denotes a spring shackle comprising the bolts B, each of which has mounted thereon a bushing 1 with which the extremity of a spring is adapted to be engaged in a well known manner.

Each of the bolts B is provided with a cup-shaped head 2 and in threaded engagement with the periphery of said head 2 is a cap 3. When the cap 3 is shouldered upon the head 2, said cap is locked in applied position by the screw 4.

The shank of the bolt B is provided with an axial bore 5 in communication with the head and extending a desired distance inwardly of said shank and terminating in a lateral port 6 opening to the periphery of the shank of the bolt and at a point substantially midway of the applied bushing 1 when the bolt B is in applied position.

A wick W is disposed through the bore 5 and having one end portion extending within the head 2 with the opposite end portion disposed through the port 6 and in contact with the inner face of the adjacent portion of the bushing 1.

Lubricating oil is placed within the head 2 and travels by capillary attraction through the wick W whereby the bearing portions of the shank of the bolt B and the sleeve 1 are effectively lubricated and in a manner whereby excessive oil is not applied to such bearing portions.

M denotes a spring member comprising a single length of material returned upon itself to provide the overlying arms 8 and 9 with the free end portion of one of the arms, as 9, terminating in an extension 10 disposed on an incline in a direction away from the arm 8. The member M is of a length to extend through the bore 5 of the bolt B and when so applied the extension 10 is disposed upwardly through the port 6. The member M provides means whereby the application of the wick is facilitated and the inserted end portion of said wick is maintained in effective lubricating engagement with the inner surface of the bushing 1 in a manner which is clearly illustrated in the accompanying drawings.

The side wall of the cap 3 adjacent its closed end or head is provided with an opening 11 which, when the cap 3 is in applied position registers with the notch or recess 12 produced in the outer marginal portion of the wall of the head 2 providing means whereby a new supply of oil may be readily admitted within the head 2 without the necessity of removing the cap 3. The cap 3 carries a plate 14 normally closing the opening 11.

From the foregoing description it is thought to be obvious that a lubricating device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A new article of manufacture, a bolt having a hollow head adapted to contain a supply of lubricant, the shank of the bolt being provided with an axial bore in communication with the head and with an opening in a side of the shank, a wick disposed through the bore of the shank, and a spring member insertible within the bore of the shank, said member comprising overlying arms, one of said arms bearing against the wall of the bore and the second of said arms with the wick, one of said arms being provided with an angular extension to force the adjacent portion of the wick through the opening in the side of the shank.

2. A new article of manufacture, a bolt having a hollow head adapted to contain a supply of lubricant, the shank of the bolt being provided with an axial bore in communication with the head and with an opening in a side of the shank, a wick disposed through the bore of the shank, and a spring member insertible within the bore of the shank, said spring member comprising two overlying arms, one of said arms bearing against the wall of the bore and the second of said arms with the wick, the first named arm being provided with an angular extension to force the adjacent portion of the wick outwardly through the opening in the side thereof.

In testimony whereof I hereunto affix my signature.

DAVID L. LAWSON.